United States Patent [19]

Baumberg

[11] Patent Number: 4,856,883
[45] Date of Patent: Aug. 15, 1989

[54] METHOD OF AND DEVICE FOR SEEING OBJECTS INCLUDING JUMP-LIKE MOVEMENTS OF AN OUTPUT IMAGE ABOUT A STATIONARY MAIN OPTICAL AXIS

[76] Inventor: Iosif Baumberg, 69 Bay 29 St., Brooklyn, N.Y. 11235

[21] Appl. No.: 142,421

[22] Filed: Jan. 11, 1988·

[51] Int. Cl.⁴ ...................... G02B 23/00; G02B 27/00; G02B 27/64
[52] U.S. Cl. ..................................... 350/538; 350/500; 350/320; 350/321; 358/93; 358/220; 351/200; 351/203
[58] Field of Search ............... 350/538, 500, 576, 545, 350/320, 321; 358/222, 89, 88, 92, 220, 93; 351/200, 203; 250/202, 213 VT, 213 R, 213 A

[56] References Cited

U.S. PATENT DOCUMENTS

| | | | |
|---|---|---|---|
| 3,378,326 | 4/1968 | Alvarez | 350/500 |
| 3,393,320 | 7/1968 | Avazi | 358/222 |
| 3,504,957 | 4/1970 | Heflinger et al. | 350/500 |
| 3,761,157 | 9/1973 | Humphrey | 350/500 |
| 4,264,152 | 4/1981 | Crane | 351/200 |

FOREIGN PATENT DOCUMENTS 1549824  8/1979  United Kingdom ................ 350/500

Primary Examiner—Jon W. Henry
Attorney, Agent, or Firm—Ilya Zborovsky

[57] ABSTRACT

Seeing of objects is performed through an optical system with a stationary main optical axis with deviating an output image of the system away of the stationary main optical axis by jump-like movements with randomly distributed time intervals.

6 Claims, 1 Drawing Sheet

METHOD OF AND DEVICE FOR SEEING OBJECTS INCLUDING JUMP-LIKE MOVEMENTS OF AN OUTPUT IMAGE ABOUT A STATIONARY MAIN OPTICAL AXIS

BACKGROUND OF THE INVENTION

The present invention relates a method of and a device for seeing objects.

The phenomenon of accommodation of eyes is well known, and its deviation from normal can be corrected by optical lenses. In addition to the above accommodation phenomenon, there is also the phenomenon of jump-like movements of eyes. The jump-like movements of eyes compensate a very little area of maximum resolution of retina, on the one hand. On the other hand, the jump-like movements of eyes reduces the relative angular speed between the jump-like eye movements and movable objects in the area of vision of a person and therefore contribute to improved ability of distinguishing the objects which move relative to the person.

There are not methods and devices which can correct birth defects or aquired defects in deviation of frequency and speed of jump-like movements of eyes from normal, or which can further improve effects which can be obtained from jump-like movements of eyes.

SUMMARY OF THE INVENTION

Figure 1:
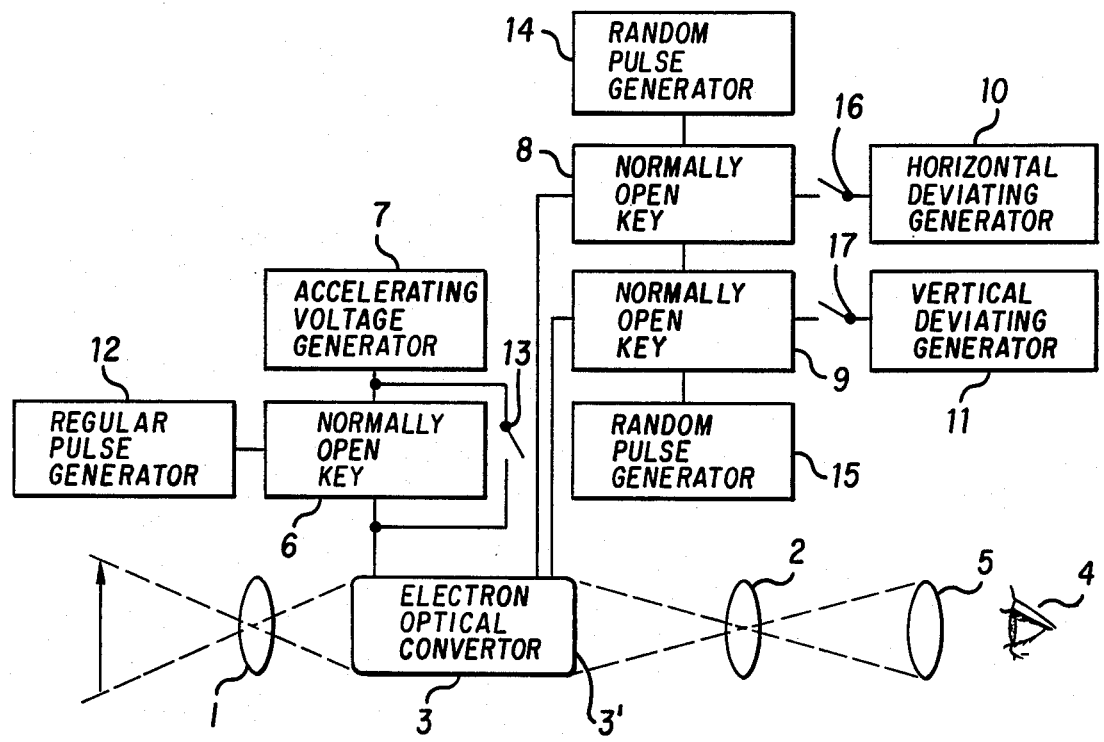
FIG. 1 is a schematic view showing a device for seeing objects in accordance with the present invention.
Figure 2:
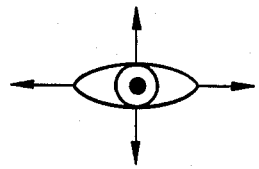
FIG. 2 is a view schematically showing deviation of a main optical axis of an optical element in the device in accordance with the present invention, during seeing the objects through the optical element.

A method and a device in accordance with the present invention are illustrated by a monocular device for observation or seeing.

Reference numeral 1 identifies an objective, while reference numeral 2 identifies inverting lense. An electron-optical convertor 3 is located between the objective 1 and the electron-optical convertor (lense) 2 so that a screen 31 onto which an image to be seen is projected, faces toward the turning lense 2. An observer 4 through an eyepiece 5 and the turning lense 2 observes the screen with the image. A first normally open key 6 is incorporated in a circuit between a source of accelerating voltage 7 and an accelerating system of electron-optical convertor. Normally open keys 8 and 9 are connected with the circuit between a generator of horizontal deviating voltage 10 and a generator of vertical displacing voltage 11, respectively. A controlling input of the normally closed key 6 is connected with a generator of regular pulse sequence 12. A switch 13 can close the input and output of the key 6. Controlling inputs of the keys 8 and 9 are connected with outputs of respective generators of randomly distributed pulses 14 and 15. Switches 16 and 17 can disconnect the generators 10 and 11 from the deviating systems. The electron-optical convertor can be formed an an electron-optical convertor with deviating systems which are used in a system of speed filming.

The above described device operates in the following manner.

With the help of the means for observation which includes the objective 1, the lense 2, the electron-otical convertor 3, an observer 4 through the eyepiece 5 observes an object. Under the action of generators of randomly distributed in time pulses 14 and 15, during the action of pulses, with the switches 16 and 17 closed, deviating voltages are supplied from the respective generators 10 and 11 to the deviating systems and deviate the image of the object projected on the screen 31 and therefore onto retina of eyes in random time moments by a certain angle. If it is required to observe objects with jump-like movement only in a horizontal direction, the supply of voltage to the system of vertical deviation is turned off. If it is required to observe only vertical jumps in an object to be observed, the supply of voltage to the horizontal deviating system is turned off. It is also possible to turn on or to turn off simultaneously both systems.

When an observer desires, the frequency of deviation in any direction can be changed by respective adjustment (setting) of an average frequency of the generators 14 and 15. The selection of random (accidental) moments of time for supplying of deviating voltages to the deviating systems practically eliminates the phenomenon of flickering which could take place with the use of regular frequency. On the other hand, It is optimal during observation of phenomena which are subjected to action of random events.

Random coincidence it time of jump-like movements of eyes with jump-like deviation of image of an object of observation reinforces the effect in the event when the directions of jumps coincide with one another, and reduces the effect when the directions of jumps do not coincide. The total number of random coincidences is low as can be seen from the following formula:

$$F = t_1 t_2 f_1 f_2,$$

wherein

F is a frequency of randomly coincided pulses; $t_1$ and $t_2$ is a duration (time length) of pulses of jump-like movements of eyes and of generators;

$f_1$ and $f_2$ are average statistic frequencies of jump-like movements of eyes and of generators of randomly distributed pulses.

The jump-like movements of eyes generally have one jump with duration of 1/16–1/20 sec, and interval between the jumps characterized by 2–5 jumps per sec. The jump-like deviations can be performed basically with the same parameters.

The invention is not limited to the details shown since various modifications and structural changes are possible without departing in any way from the spirit of the present invention.

What is desired to be protected by Letters Patent is set forth in particular in the appended claims.

I claim:

1. A method of seeing objects, comprising the steps of seeing through an optical system having a stationary main optical axis throughout the optical system; and deviating an output image of the optical system away of the stationary main optical axis by jump-like movements with randomly distributed intervals.

2. A method as defined in claim 1, wherein said deviating includes deviating the image of the output image by a limited angle with an apex substantially located on a retina of an eye of an observer.

3. A method as defined in claim 1, wherein said deviating includes deviating the image of the output image in at least one of four directions selected from the group consisting of right, left, upward and downward directions.

4. A method as defined in claim 3, wherein said deviating includes deviating the image of the output image in a plurality of directions selected from the group consisting of right, left, upward and downward directions.

5. A method as defined in claim 1, wherein said seeing includes seeing also through another optical system having another stationary optical axis throughout the other optical system, said deviating including deviating both output images of both said optical systems from both said stationary main optical axes by jump-like movements synchronously with one another.

6. A device for seeing objects, comprising
an optical system having a stationary main optical axis throughout said optical system so that an observer can see through said optical system; and
means for deviating an output image of said optical system away of said stationary main optical axis of said optical system by jump-like movements with randomly distributed time intervals.

* * * * *